(12) United States Patent
Stauffer et al.

(10) Patent No.: US 8,487,946 B2
(45) Date of Patent: *Jul. 16, 2013

(54) METHODS AND SYSTEMS FOR PROCESSING OBJECTS IN MEMORY

(75) Inventors: John Stauffer, Morgan Hill, CA (US); Michael K. Larson, Kirkland, WA (US); Charlie Lao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 247 days.

This patent is subject to a terminal disclaimer.

(21) Appl. No.: 12/844,764

(22) Filed: Jul. 27, 2010

(65) Prior Publication Data

US 2010/0289805 A1 Nov. 18, 2010

Related U.S. Application Data

(63) Continuation of application No. 11/112,921, filed on Apr. 22, 2005, now Pat. No. 7,764,289.

(51) Int. Cl.
- *G06T 1/60* (2006.01)
- *G06F 13/14* (2006.01)
- *G06F 13/00* (2006.01)
- *G06F 15/167* (2006.01)
- *G06F 13/28* (2006.01)

(52) U.S. Cl.
USPC ........... 345/530; 345/519; 345/536; 345/537; 345/543; 709/213; 709/214; 710/22; 711/118; 711/119; 711/122

(58) Field of Classification Search
None
See application file for complete search history.

(56) References Cited

U.S. PATENT DOCUMENTS

| 6,995,773 | B2 | 2/2006 | Doyle et al. |
| 7,764,289 | B2 * | 7/2010 | Stauffer et al. ............... 345/530 |
| 2003/0163596 | A1 | 8/2003 | Halter et al. |
| 2004/0160449 | A1 | 8/2004 | Gossalia et al. |
| 2006/0143395 | A1 | 6/2006 | Zohar et al. |

FOREIGN PATENT DOCUMENTS

EP 0926600 A1 6/1999

OTHER PUBLICATIONS

PCT International Search Report and Written Opinion for PCT International Appln. No. US2006/013491, mailed Oct. 24, 2006 (10 pages).

Foley et al. Computer Graphics: Principles and Practice Second Edition in C, 1997, Addison-Wesley, 859.

Pitts, Introduction to inheritance in C++, web article, http://web.archive.org/web/20020121060206/www.cs.bu.edu/teaching/cpp/inheritance/intro/.

* cited by examiner

*Primary Examiner* — Tize Ma
(74) *Attorney, Agent, or Firm* — Blakely, Sokoloff, Taylor & Zafman LLP

(57) ABSTRACT

Methods and apparatuses to create and manage volatile graphics objects in a video memory are disclosed. An object is created and marked as volatile. The volatile object is stored in a video memory of a graphics subsystem. A volatile marking indicates that data for an object is not to be paged out from the video memory to make room for other data. The video memory space occupied by the volatile object is indicated as a volatile storage, in a data structure. Another object is written into at least a portion of the video memory space, which is occupied by the volatile object, without paging out data for the volatile object. In one embodiment, at least a portion of the volatile object is referenced or used while another object is formed. The volatile object may be discarded after being referenced or used to form another object.

15 Claims, 18 Drawing Sheets

700

| VOLATILE OBJECT NAME | PHYSICAL ADDRESS RANGE IN A VIDEO MEMORY |
|---|---|
| 123 | range 1 |
| 151 | range 2 |
| mnl | range n |

METHODS AND SYSTEMS FOR PROCESSING OBJECTS IN MEMORY

This application is a continuation of U.S. patent application Ser. No. 11/112,921, filed on Apr. 22, 2005 now U.S. Pat. No. 7,764,289.

FIELD

Embodiments of the invention relate to computer graphics. More particularly, embodiments of the invention relate to objects in a video memory.

BACKGROUND

Computer graphics refers to any processing device or program that makes a data processing system, such as computer capable of displaying and manipulating, e.g. drawing, inputting, and outputting, graphics objects. In general, an object may be a self-contained entity that may include both data and procedures to manipulate the data. Graphics objects include shapes and pictures that appear on a display screen. In particular, graphics objects may include lines, texts, polygons' surfaces, images, textures. For example, a three-dimensional picture element ("pixel"), in addition to two-dimensional properties of position, color, and brightness, has a depth property that indicates where the pixel lies along an imaginary Z-axis. When many 3D pixels are combined, each with its own depth value, the result is an image, which appears to be a three-dimensional surface or image. Multiple graphics objects may interact with one another. For example, a solid object may partially hide an object behind it. 3D graphics may support more sophisticated techniques such as ray tracing to apply realistic shadowing to an image.

Accordingly, processes of rendering information to be displayed may require a computer system have considerable memory and processing speed. Typically, a graphics processing unit ("GPU") is used to process graphics objects that lifts the burden off the Central Processing Unit ("CPU") that can be used to perform other tasks. The data for the graphics objects may be stored in a video memory. The video display electronics reads the data from the video memory and converts it into the signals to drive the display.

The video memory to store the image to be displayed on a computer display may be a video random access memory ("VRAM"). VRAM, unlike a system memory, e.g., RAM, may be dual ported to allow the display electronics to access it for screen updates in the same time as the processing unit accesses it to provide new data. VRAM is fast enough to supply data to the display electronics at the speed at which the display screen is scanned.

FIG. 1 illustrates prior art handling of graphics objects in video memory 102, such as a video random access memory ("VRAM"). As shown in FIG. 1, a texture object Text 1 and a texture object Text 2 are stored in portions 111 and 112 in host system memory 110, such as dynamic random access memory ("DRAM"). Typically, host system memory 110 is substantially larger than video memory 102. When a first client application needs to use a texture object Text 1 in video memory 102, the texture object Text 1 is copied ("transition 1") from the host system memory 110 to the video memory 102. The texture object Text 1 is stored in the video memory 102 consuming a portion 113 of the physical space in the video memory 102. When a texture object Text 2 needs to be written in video memory 102 and there is no physical space in video memory 102 for the texture object Text 2, the texture object Text 1 is deleted in operation 3 from the portion 113 to free a physical space in video memory 102 for the texture object Text 2. Then the texture object Text 2 is copied ("transition 2") from the host system memory 110 and stored into the portion 113 of the video memory 102. Each of the texture object Text 1 and the texture object Text 2 does not need to be moved back to the host system memory 110, because master copies of each of them exist in portions 111 and 112 of host memory 110.

Surface object Surf 1 is created and stored in a portion 115 of the video memory 102, as shown in FIG. 1. Surface object Surf 1 does not have a master copy in host system memory 110, as shown in FIG. 1. This lack of a copy in system memory 110 may happen because the GPU may have created the surface object directly in the GPU memory (rather than the CPU creating it in system memory). Typically, GPU uses a surface object in video memory 102 to draw into the surface. When portion 115 is needed to write other data into video memory 102 and there is no physical space in video memory 102 for the other data, the surface object Surf 1 is forced to move ("transition 4") to host system memory 110 to free the portion 115 of the physical space in video memory 102. This transition 4 may be considered to be a page out from VRAM to system memory. A portion 114 of the physical space in the host memory 110 is allocated to store the surface object Surf 1. When the surface object Surf 1 needs to be used in the video memory 102 again, the surface object Surf 1 is moved back ("transition 5") from host system memory 110 to video memory 102. This transition 5 may be considered to be a page in operation for the VRAM (in which the data is paged into the VRAM from the system memory). That means, using the surface object in video memory 102 requires transferring data back and forth across at least one bus connecting video memory 102 and host system memory 110. A bus connecting video memory 102 and host system memory 110 has a finite bandwidth and typically is capable of transferring data with a slow speed of 600 to 800 Megabytes per second ("Mb/s"). Current handling of graphics objects in video memory 102 not only creates a significant bottleneck in data transfer between a video memory and a system memory, but also makes a graphics system very expensive.

SUMMARY OF THE DESCRIPTION

Methods and apparatuses to create and manage volatile graphics objects in a video memory of a computer system are disclosed. In one embodiment, a graphics object may be created and indicated (e.g., "marked") as volatile or non-volatile in the video memory of a graphics subsystem in response to a command from a client application, which is being executed on a processor, which is not part of the graphics subsystem of the computer system. Alternatively, the graphics subsystem may determine whether an object should be marked as volatile. In another embodiment, the information that the object is volatile, is provided by the client application. In one embodiment, the object may be created using one or more graphics resources virtualized through an interface between graphics hardware and graphics clients. In one embodiment, the object does not have a back-up copy in a system memory of the computer system.

Further, in certain embodiments, a space in a video memory, e.g., video random access memory ("VRAM"), of the graphics subsystem is allocated, and the object is stored in the allocated space. A determination is made whether the object has a volatile marking. The volatile marking for the object informs the graphics subsystem that data for the volatile object, or the volatile object, is retained in the video memory until the space is needed in the video memory for other data. The volatile marking for the object informs the graphics subsystem that data for the volatile object, or the volatile object, does not need to be paged out of the video memory to make room for other data. For example, the volatile object does not need to be paged out of the video memory to a system memory, e.g., DRAM, when one or more clients are over committing the video memory. Next, information indicating a video memory space, which is occupied by the volatile object, is stored. The video memory space for the volatile object is indicated as a volatile storage, in a data structure. The video memory is virtualized by a virtual memory system, which is capable of causing data to be paged out of and paged into the video memory, but data for the object, which is indicated as volatile, is not to be paged out from the video memory to make room for other data.

In one embodiment, search for the volatile marking in the video memory or a data structure, which indicates which portions of the video memory are marked as having volatile data, may be performed before writing another object into the video memory. Another object may be written into at least a portion of the same video memory space occupied by the volatile object without paging out the volatile object, or the data for the volatile object, from the video memory. In one embodiment, the volatile object is discarded to free space in the video memory for another object without paging out data for the volatile object from the video memory.

In one embodiment, at least a portion of the volatile object is referenced or used as an input to form another volatile object in the video memory. The volatile object may be discarded, after being referenced or used. The process of referencing or using the previous volatile object to form the next volatile object, and discarding data for the volatile object after the volatile object is being referenced or used, may be repeated until volatile objects are not needed.

The present invention describes systems, methods, and machine-readable media of varying scope. In addition to the aspects of the present invention described in this summary, further aspects of the invention will become apparent by reference to the drawings and by reading the detailed description that follows.

BRIEF DESCRIPTION OF THE DRAWINGS

The present invention is illustrated by way of example and not limitation in the figures of the accompanying drawings in which like references indicate similar elements.

FIG. 7 illustrates a data structure containing a list of volatile graphics objects according to one embodiment of the invention.

DETAILED DESCRIPTION

The subject invention will be described with reference to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail.

Reference throughout the specification to "one embodiment", "another embodiment", or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

It will also be understood that the terms "page" or "page in" or "page out" refer to moving data, which may or may not be in fixed size blocks (e.g., fixed range of addresses) of memory, rather than the movement of data in only fixed size blocks of data (e.g., a fixed size and range of addresses, such as a fixed size of 64 kB of data, which is moved as a block).

It will also be understood that, in certain embodiments, the various aspects described herein may be used for the system memory (e.g., system memory 215) rather than or in addition to the video memory (e.g., VRAM 218), thereby alleviating the need to page out a volatile object from the system memory to a backing store, such as a hard drive.

Figure 2A:
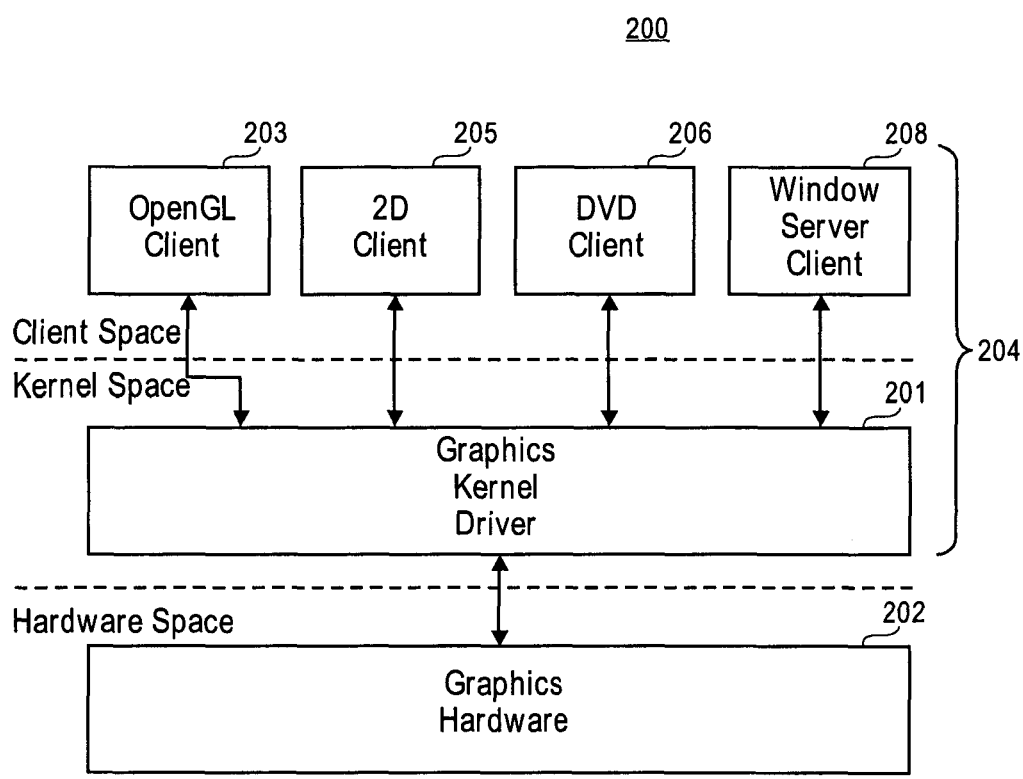
FIG. 2A illustrates a graphics driver stack, which may create and manage volatile objects in a video memory according to one embodiment of the invention.

FIG. 2A illustrates a graphics driver stack 200, which may create and manage volatile objects in a video memory according to one embodiment of the invention. A graphics kernel driver 201 interfaces between graphics client drivers 203, 205, 206, 208 and graphics hardware 202. Graphics kernel driver 201 may handle graphics resources, (for example, it may virtualize limited graphics resources, such as video memory, used by the graphics hardware 202 and manage contention among the client drivers for the graphics resources creating a virtual memory system) such that data is paged out of and paged into a video memory by the virtual memory system, which may be provided by the graphics kernel device 201. The virtual memory system operation is described in further details below with respect to FIG. 3. The virtualized resources appear as unlimited resources to the client drivers 203, 205, 206, 208 that allows the client drivers to be simplified since, for example, they are no longer required to de-fragment or compact their assigned memory. Graphics resources eligible for virtualization include any limited resource used by the graphics hardware 202, e.g., a graphics memory to store graphics objects, GART (graphics address re-mapping table) entries, memory apertures for accessing, for example, a video memory or registers, specialized memory areas for hierarchical depth buffers. Graphics memory may be either integrated in the graphics hardware 202 or allocated in a system memory.

Figure 2B:
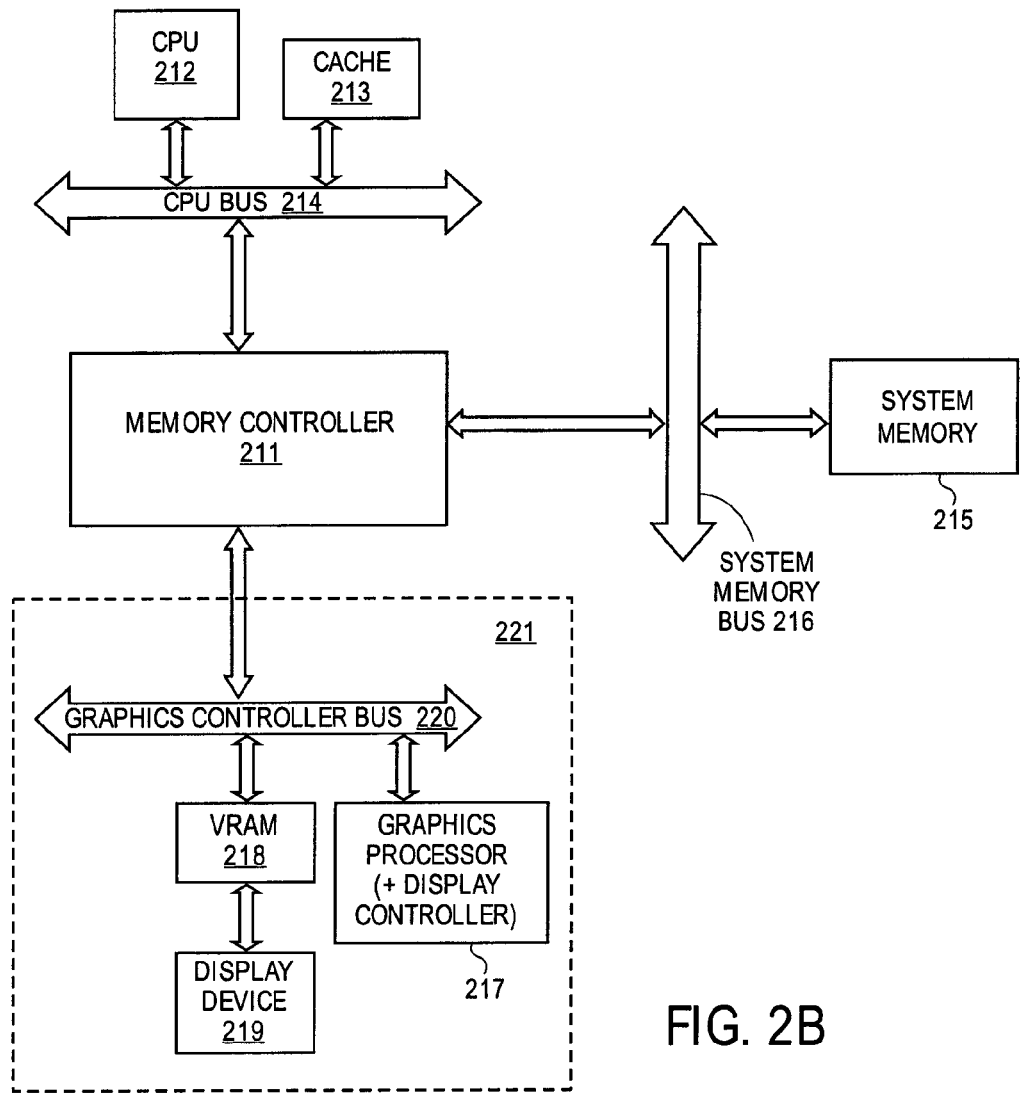
FIG. 2B is a block diagram of an exemplary computer system, which may manage volatile and non-volatile graphics objects according to one embodiment of the invention.

FIG. 2B is a block diagram of an exemplary computer system 210 that may manage volatile and non-volatile graphics objects according to one embodiment of the invention. As shown in FIG. 2B, a CPU 212 (which may be the system main microprocessor, such as a power PC microprocessor or a Pentium microprocessor), a cache 213, a system memory 215, a video memory 218, e.g., VRAM, and a graphics processor ("GPU") 217 with optional display controller are coupled to each other through a memory controller 211, and buses 214, 216, and 220. As shown in FIG. 2B, CPU 212 gets access to system memory 215 through CPU bus 214 and memory controller 211 and system memory bus 216. System memory bus 216 connects system memory 215 (e.g., DRAM, non-volatile storage, volatile storage, etc.) to memory controller 211. In one embodiment, system memory bus 216 is a 6.8 Gb/s uni-directional bus.

In contrast, video memory 218 couples to CPU 212 through graphics controller bus 220 and may require a separate video memory controller, typically embedded in graphics processor 217. As shown in FIG. 2B, video memory 218 is dual ported and caches source and result data as well as command data for graphics processor 217, and in the same time provides data for refreshing display device 219. Typically, video memory 218 is faster than system memory 215. Video memory 218, graphics processor 217 and other devices that use video memory as a storage form a graphics subsystem 221, which couples to the rest of computer system 210 through graphics controller bus 220.

In an embodiment, video memory 218 may be VRAM, WRAM, RDRAM, SGRAM, or any combination thereof. Video memory 218 may have different physical blocks than system memory, and identifiers for these different physical blocks of video memory 218 may overlap the identifiers for system memory 215. In an embodiment, system memory 215 may refer to physical memory that is internal to the CPU 212.

As shown in FIG. 2B, a CPU bus 214 connects the CPU 212, e.g., a microprocessor, and the cache 213, which may be an off-chip and/or on-chip cache, to the memory controller 211. In one embodiment, CPU bus 214 may be a 3.4-Gbytes per second ("Gb/s") bi-directional bus.

As shown in FIG. 2B, a graphics controller bus 220 connects a graphics subsystem 221, including video memory 218 and GPU 217, to memory controller 211. In one embodiment, video memory 218 and graphics processor 217 e.g., a graphics microprocessor, are incorporated in a graphics controller, which is sometimes referred to as a graphics card. In another embodiment, the graphics processor 217 is communicatively coupled to the video memory 218 to receive a graphics resource from a client application (e.g., a drawing application, a graphics application, etc.) of CPU 212, based on a translation of a virtual address of a portion of video memory 218 to the physical memory location. In one embodiment, graphics controller bus 220 may be an Accelerated Graphics Port ("AGP") bus, a Peripheral Component Interconnect ("PCI") bus, a PCI Express bus, and/or any other type of bus between a memory controller and graphics hardware. In one embodiment, the graphics controller bus 220 is 2 Gb/sec uni-directional bus, with an actual uni-directional throughput of 1.8 Gb/sec.

Figure 3A:
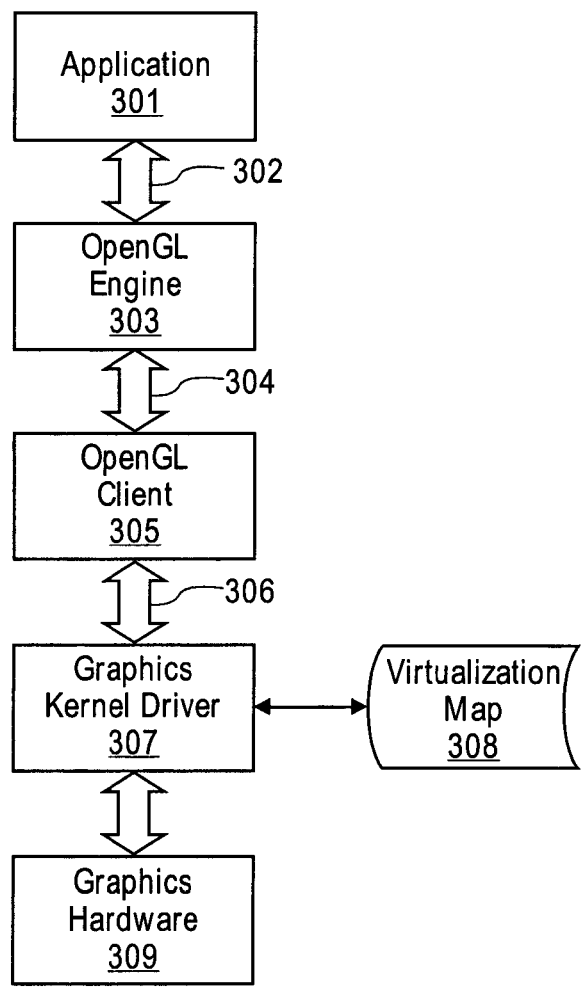
FIG. 3A illustrates managing graphics data, including volatile and non-volatile objects, in the driver stack as of FIG. 2A according to one embodiment of the invention.

FIG. 3A illustrates managing graphics data, including volatile and non-volatile objects, in driver stack 200 of FIG. 2A according to one embodiment of the invention. In one embodiment, graphics kernel driver 307 may manage the allocation of memory among clients 305, e.g., OpenGL clients, through a virtualization map 308 creating the virtual memory system for the video memory. In one embodiment, virtualization map 308 may be a physical address range allocation table. The clients may be unaware of the physical memory location of a graphics resource. The virtualization map 308 indicates how video memory is currently allocated, including which block a client is using. In certain embodiments, the flag, or other indicator, which indicates that an object is volatile, may be stored in the virtualization map.

In one embodiment, as shown in FIG. 3A, an application 301 calls an OpenGL engine 303 through an OpenGL API (application program interface) 302 to create an image. The OpenGL engine 303, which may be executed on the CPU 212 of FIG. 2B, determines how to divide the image processing work between the CPU 212 and GPU 217 of FIG. 2B of the graphics hardware 309, and sends the commands to be processed by GPU 217 to client driver 305 through a client driver application program interface ("API") 304. Client driver 305, which may be also executed on CPU 212, evaluates the commands and determines that it needs graphics memory to create an image. Client driver 305 requests a block of memory from graphics kernel driver 307 through a kernel driver API call 306. Graphics kernel driver 307, which may be executed on GPU 217, records the request in an entry in the virtualization map 308, and associates an identifier (e.g., a virtual address) with the entry. Graphics kernel driver 307 returns the identifier to client driver 305 for use in all commands that access the memory block. Because the native command structure for OpenGL and the graphics hardware is unaffected by the virtualization, neither application 301, OpenGL engine 303, nor hardware 309 require modification to operate in conjunction with virtualization.

Figure 3B:
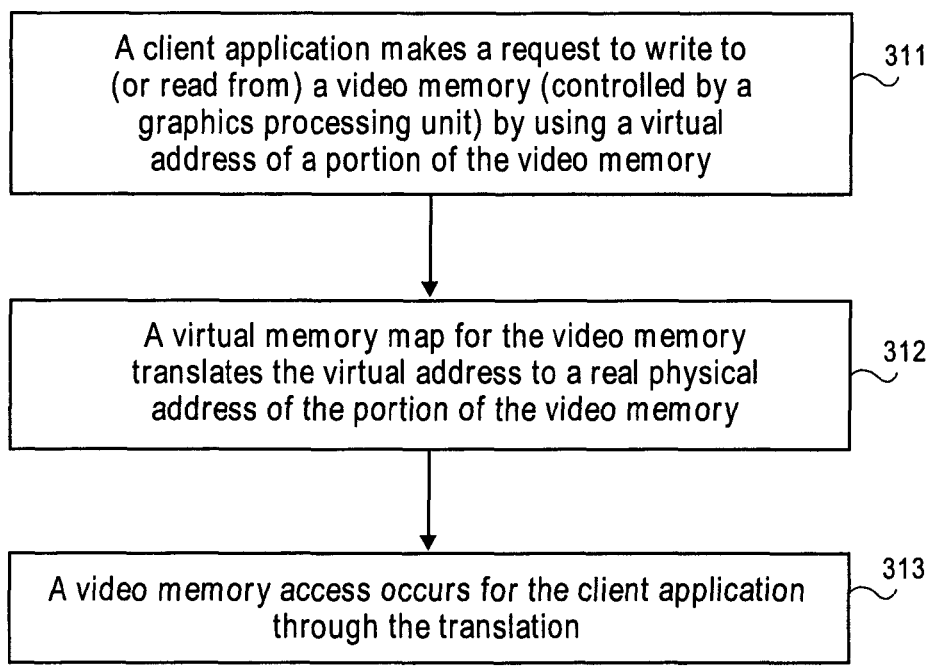
FIG. 3B is a flowchart of a virtual address translation to provide access for a client application to a video memory as of FIG. 2B according to one embodiment of the invention.

FIG. 3B is a flowchart of a virtual address translation to provide access for a client application to a video memory, e.g., video memory 218 of FIG. 2B, according to one embodiment of the invention. In operation 311, a client application (e.g., a client application having any of client drivers 203, 205, 206, and 208 of FIG. 2A) makes a request to write to (or read from) the video memory controlled by a GPU, by using a virtual address of a portion of the video memory. In operation 312, a virtual memory map, e.g., virtualization map 308 of FIG. 3A, for the video memory translates the virtual address to a real physical address of the portion of the video memory. In operation 313, a video memory access (e.g., ability to read/write) occurs for the client application through the translation.

Figure 4:
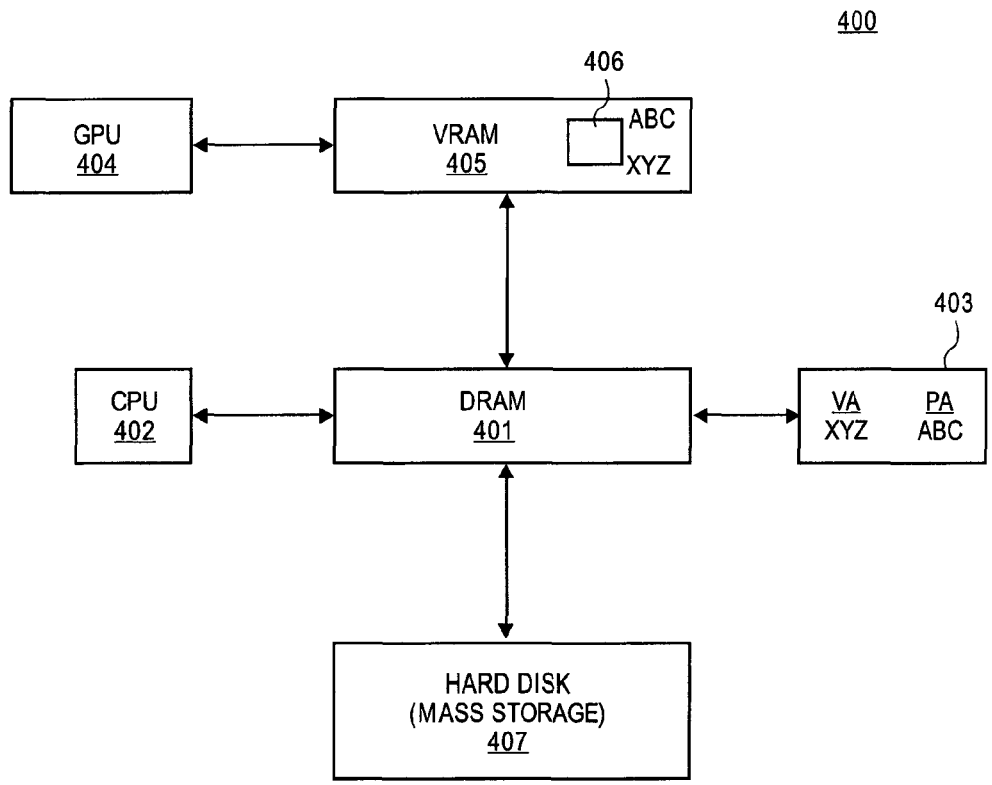
FIG. 4 is a block diagram of a virtual memory system to create and manage volatile objects according to one embodiment of the invention.

FIG. 4 is a block diagram 400 of a virtual memory system to create and manage volatile objects according to one embodiment of the invention. As shown in FIG. 4, a video memory 405 (which may represent VRAM 218) includes a portion 406 of a space for volatile or non-volatile objects and is controlled by GPU 404 (which may represent GPU 217). System memory 401 (which may represent system memory 215), which is coupled to a mass storage device 407, e.g., a hard disk and controlled by CPU 402, is connected to video memory 405, e.g., VRAM, as shown in FIG. 4. In one embodiment, to manage physical space in video memory 405, video memory is virtualized as described above with respect to FIGS. 3A and 3B, such that data may be paged out of video memory 405 to system memory 401 to make room for other data, and paged back into video memory 405 from system memory 401 when needed. Virtualization map 403 providing translation virtual memory address XYZ to physical memory address ABC in video memory 406 for a graphics object, is coupled to system memory 401, as shown in FIG. 4. In alternate embodiments, virtualization map 403 may reside as a whole in system memory 401, partly reside in system memory 401, or may reside entirely outside system memory 401.

Figure 1:
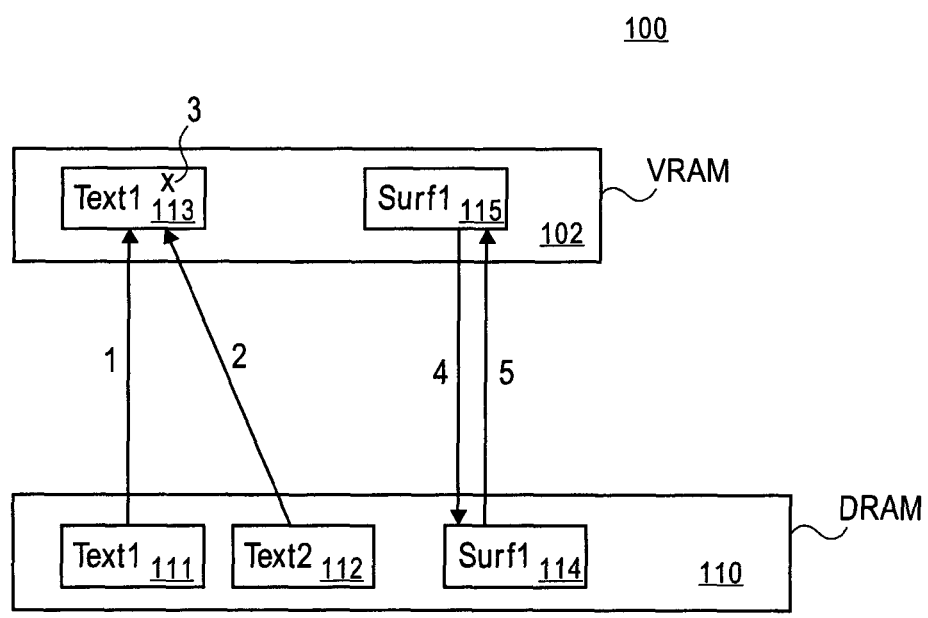
FIG. 1 illustrates prior art handling of graphics objects in video memory.
Figure 5:
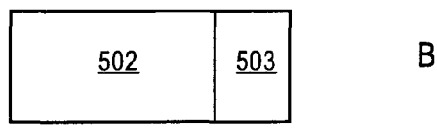
FIGS. 5A and 5B illustrate marking of graphics objects according to one embodiment of the invention.
Figure 5:
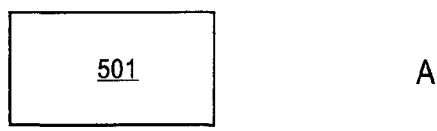

FIGS. 5A and 5B illustrate graphics objects 501 and 502 with (e.g., a flag, or other indicator) and without a marking according to one embodiment of the invention. Graphics object 501 does not have a volatile or non-volatile marking, as shown in FIG. 5A. Graphics object 502 has a marking 503 that may set graphics object 502 into a volatile or a non-volatile state. Graphics object 502 may be, for example, a line, a text, a polygon, a surface, a texture, or any combination thereof. Setting a graphics object 502 into the volatile state defines a timeline where data for graphics object 502 to be retained until space in a video memory is needed for other data. In one embodiment, the marking is useful when clients are over committing a video memory, e.g., VRAM, and forcing graphics objects to be paged out of the video memory back to a system memory, e.g., DRAM. Instead of being paged out of the video memory back to the system memory, graphics object 502 having a volatile marking is discarded or deleted, and not paged out to the system memory, and the avoidance of paging out results in a significant performance benefit for a computer system. In one embodiment, the marking is useful for general clean up operations to remove data, which is no longer needed. In one embodiment, graphics object 502 having a volatile marking is created in a video memory and does not have a back-up copy in a system memory (unlike the texture map examples shown in FIG. 1).

In certain embodiments, a system may use an indicator, such as a mark or flag, to indicate that an object has a first state (e.g., a volatile state) and leave other objects that are in another state (e.g., second state) without any indicator, and the absence of the indicator effectively indicates that such other objects are in the another state. For example, a system may use the presence of a bit to indicate that a first object is volatile, and the absence of the bit indicates that a second object is non-volatile; alternatively, the system may use the presence of a bit to indicate that an object is non-volatile and the absence of the bit for another object indicates that the another object is volatile. These approaches effectively assume the lack of an indicator shows a state. It will be appreciated that, in these approaches, the absence of an indicator is in effect a marking, or indicator.

In one embodiment, volatility marking 503 is a flag, e.g., a single bit of information, which may be true when a graphics object 502 is set into a volatile state or false when graphics object 502 is set into non-volatile state, or vice versa. In one embodiment, an object may be created and marked as volatile or non-volatile by a graphics kernel or GPU in response to a command from a client application. In this case, the GPU decides whether to mark the object as volatile or non-volatile. In another embodiment, an object having a volatile or non-volatile marking is received by a graphics subsystem from a client application, which has determined whether the object is volatile or non-volatile. In one embodiment, a client API is being executed on a processor, which is not part of the graphics subsystem.

Figure 12:
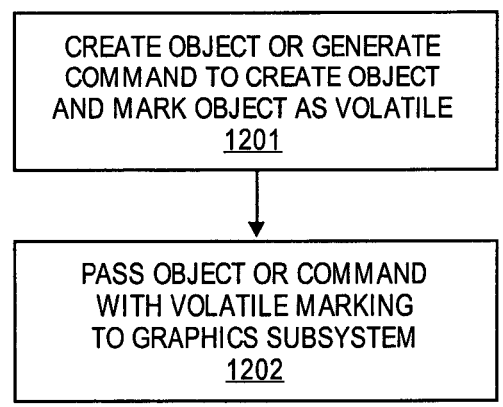
FIG. 12 is a flowchart of a method to manage volatile objects that may be performed by a client application according to one embodiment of the invention.

FIG. 12 is a flowchart 1200 of a method to manage volatile objects that may be performed by a client API according to one embodiment of the invention. The method starts with operation 1201, which creates graphics object 503 and marks graphics object 503 as volatile, by setting, e.g., a volatility flag, as described above with respect to FIG. 5. In another embodiment, operation 1201 includes generating a command to create graphics object 503 (which command is executed, for example, by a GPU) and to mark graphics object 503 as volatile. The method continues with operation 1202 of passing graphics object 503 with a volatile marking to a graphics subsystem, as shown in FIG. 12. In another embodiment, operation 1202 includes passing a command to create graphics object 503 with a volatile marking to the graphics subsystem, as shown in FIG. 12. Passing graphics object 503 having the volatile marking informs the graphics subsystem that the object does not need to be paged from the video memory by the virtual memory system when space in the video memory is needed to store other data.

Figure 6A:
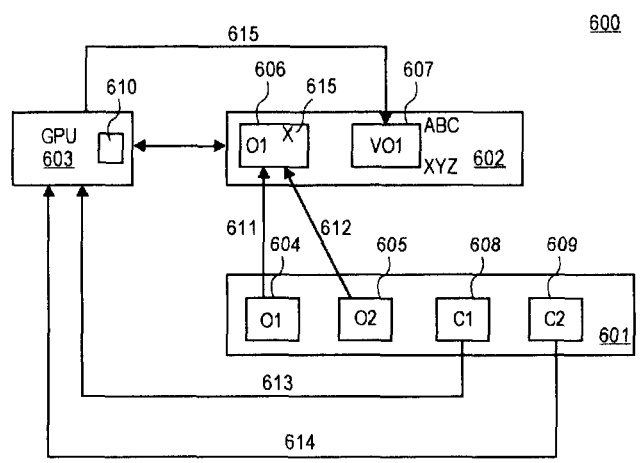
FIG. 6A is an exemplary embodiment of a graphics subsystem to manage volatile objects.

FIG. 6A is an exemplary embodiment of a graphics subsystem 600 to manage volatile objects as described above with respect to FIGS. 5 and 12. As shown in FIG. 6A, graphics subsystem 600 includes a video memory 602, e.g., VRAM, controlled by GPU 603. System memory 601 is coupled to video memory 602 directly or through GPU 603, as shown in FIG. 6A.

As shown in FIG. 6A, graphics objects O1 and O2 have backup copies in system memory 601 that consume portions 604 and 605 in system memory 601. In one embodiment, graphics object O1 may be paged into video memory 602 from system memory 601 by a virtual memory system, as described above with respect to FIGS. 2 and 3. Line 611 represents this paging into the video memory. Graphics object O1 is deleted (as shown by "x" 615) from video memory 602 to free a space in video memory 602 for graphics object O2. Then graphics object O2 is paged (as shown by line 612) into video memory 602 by the virtual memory system, as shown in FIG. 6A. In one embodiment, graphics object O2 may be written into portion 615 of video memory 602 over graphics object O1.

As shown in FIG. 6A, volatile object VO1 is created in video memory 602 consuming a portion 607 of a space in video memory 602. In one embodiment, volatile object VO1 does not have master or backup copy in system memory 601, as shown in FIG. 6A. In one embodiment, volatile object VO1 may be created by a client application, as described above with respect to FIG. 12, and received by GPU 603 of graphics subsystem 600. Volatile object VO1 may be stored in portion 610 of a memory in GPU and transferred to video memory 602, as shown in FIG. 6A. In another embodiment, the volatile object VO1 is created 615 by GPU 603 in video memory 602 in response to a command received from the client application. In an embodiment, commands C1 and C2 to create, for example, volatile objects VO1 and V02, respectively, are stored in system memory 601. Commands C1 and C2 consume portions 608 and 609 of the space in system memory 601. GPU 603 may create volatile object VO1 in portion 607 of video memory 602 in response 613 to command C1 stored in portion 608 in system memory 601. In one embodiment, volatile object VO1 is created in video memory 602 by the virtual memory system through translation of virtual memory address XYZ to physical memory address ABC, as described above with respect to FIGS. 2 and 3. Further, volatile object VO1 is discarded to free portion 607 for another object, without being paged from video memory 602 to system memory 601.

Figure 6B:
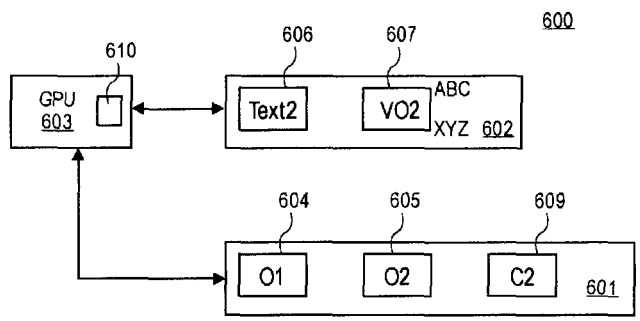
FIG. 6B illustrates graphics subsystem of FIG. 6A, after a portion of a video memory is occupied by another graphics object according to one embodiment of the invention.

FIG. 6B illustrates graphics subsystem 600 after portion 607 of video memory 602 is occupied by another graphics object according to one embodiment of the invention. As shown in FIG. 6B, another volatile graphics object VO2 is written into portion 607 over the volatile object VO1. As shown in FIG. 6, another volatile graphics object is created by GPU 603 in response to command C2 stored in system memory 601. In one embodiment volatile graphics objects VO1 and VO2 are surface objects and graphics objects O1 and O2 are texture objects, as shown in FIG. 6B.

Figure 13:
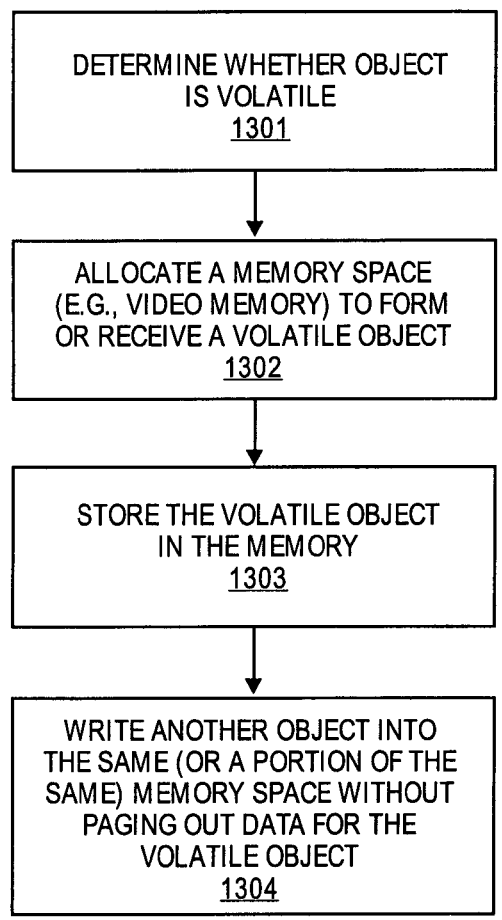
FIG. 13 is a flowchart a method to manage volatile objects that may be performed by a graphics subsystem according to one embodiment of the invention.

FIG. 13 is a flowchart 1300 of a method to manage volatile objects VO1 and VO2 that may be performed by the graphics subsystem 600 according to one embodiment of the invention. The method begins with operation 1301 of determining whether a graphics object is volatile by, for example, determining the setting of a volatility flag in the graphics object. The method continues with operation 1302 of allocating a memory space, e.g., a video memory space, to form or receive the volatile object. Next, operation 1303 of storing the volatile object in the memory is performed. The method continues with operation 1304 of writing another object (which may or may not be a volatile object) into the same, or a portion of the same memory space without paging out data for the volatile object previously stored in this space.

Figure 14:
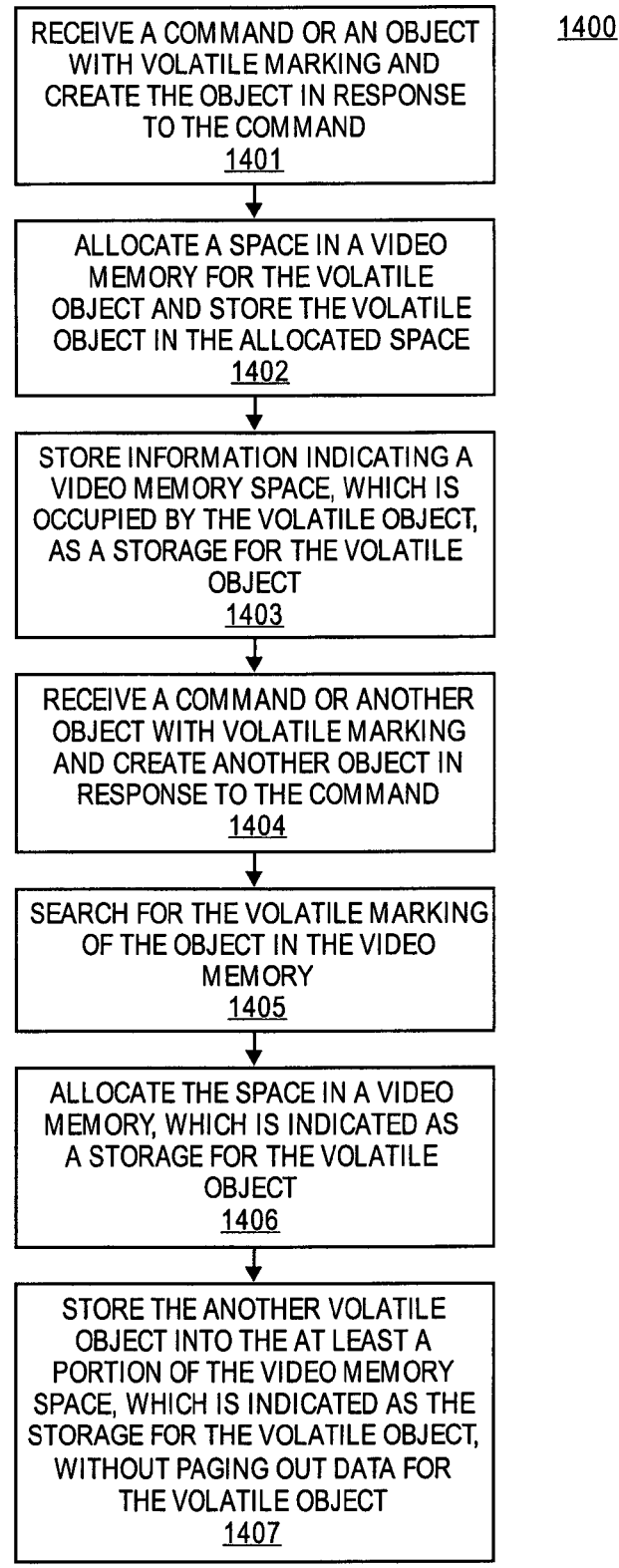
FIG. 14 is a flowchart of a method to manage volatile objects that may be performed by a graphics subsystem according to another embodiment of the invention.

FIG. 14 is a flowchart 1400 of another exemplary embodiment of a method to manage volatile objects VO1 and VO2 that may be performed by the graphics subsystem 600. The method begins with operation 1401 of receiving a graphics object with a volatile marking. A volatile graphics object may be created in response to receiving a respective command. The method continues with operation 1402 of allocating a space in a video memory for the volatile object and storing the volatile object in the allocated space. The method further continues with operation 1403 of storing information indicating a video memory space, which is occupied by the volatile object, as a volatile storage, in a data structure, which indicates which portions of the video memory are marked as having volatile data. In alternate embodiments, the data structure may be a lookup table, a map, or a combination thereof. In one embodiment, as shown in FIG. 7, the data structure 701 is a table containing a list of volatile graphics objects' names and a list of ranges of respective physical addresses in a video memory.

Referring back to FIG. 14, the method continues with operation 1404 of receiving a command to create another graphics object with a volatile marking and creating another volatile graphics object in response to the command. In another embodiment, operation 1404 includes receiving by a graphic subsystem another volatile graphics object created by another client application. The method further continues with operation 1405 of searching for memory containing volatile objects by searching for the volatile marking of the graphics object in the video memory or searching for the data structure (e.g. data structure 701), which contains the information indicating a space in a video memory is occupied by one or more volatile graphics objects. In one embodiment, searching for memory containing volatile objects may be performed by searching for non-volatile marking, or for objects without marking, assuming the lack of marking indicates a state. Next, the space in the video memory, which is indicated as a storage for the volatile graphics object, is allocated in operation 1406. Next, operation 1407 of storing another object, such as the another volatile graphics object into at least a portion of the video memory space allocated in operation 1406, is performed. The storage of the another object is performed without paging out the data for the volatile object to a backing store, such as system memory.

Figure 8:
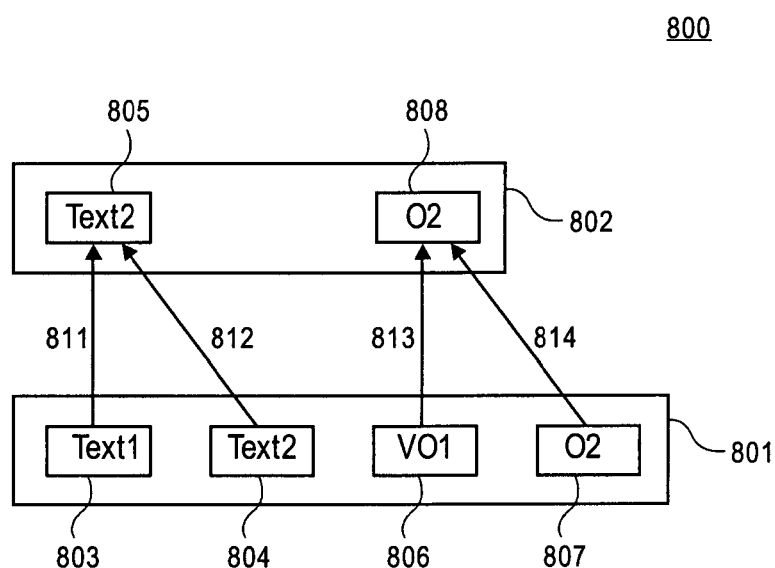
FIG. 8 illustrates managing volatile objects in a video memory, wherein at least a portion of the volatile object is generated in a system memory according to another embodiment of the invention.

FIG. 8 illustrates managing volatile objects in video memory 802, wherein at least a portion of the volatile object VO1 is generated in system memory 801 according to another embodiment of the invention. As shown in FIG. 8, a portion of volatile object VO1 806 generated in system memory 801 is paged 813 into video memory 802 to create a volatile object VO1 in space 808 of video memory 802. The graphics object 02 paged from 814 system memory 801 overwrites the volatile object VO1 occupying space 808, as shown in FIG. 8. In the same time, as shown in FIG. 8, a texture object Text 2 paged into 812 video memory 802 overwrites a texture object Text 1 previously paged into portion 805 of video memory 802. The overwriting of texture object Text 1 is performed without paging out the data for Text 1, because that data is already stored in portion 803 of the system memory 801, and the overwriting of volatile object VO1 806 in video memory occurs without paging out of the data for VO1 806, because that data is marked as volatile.

Figure 9:
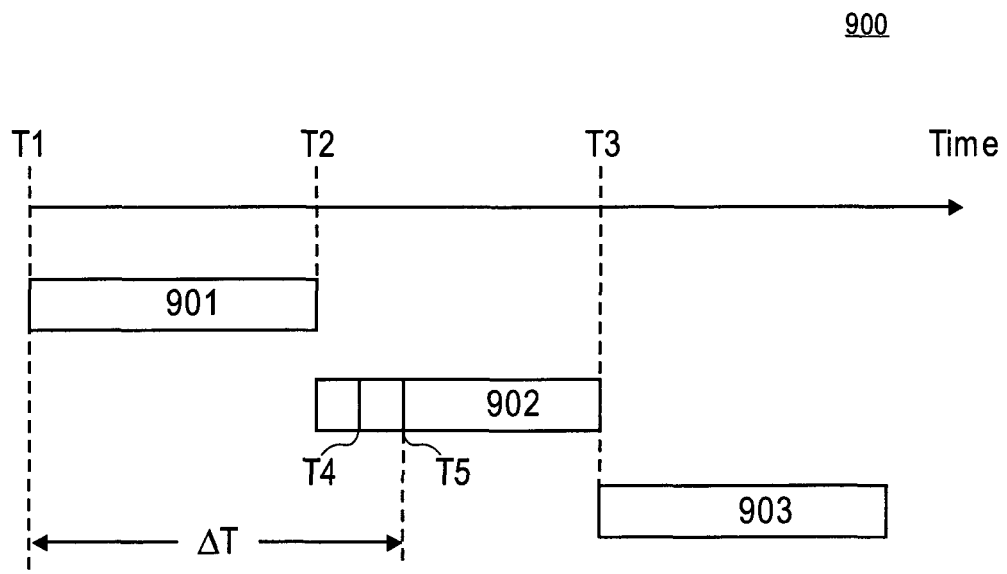
FIG. 9 is a schematic of an application timeline to draw into multiple surfaces using volatile graphics objects according to one embodiment of the invention.

FIG. 9 is a schematic 900 of an application timeline to draw into multiple surfaces using volatile graphics objects according to one embodiment of the invention. As shown in FIG. 9, drawing, for example, a polygon into volatile object 901 is performed from time T1 to time T2 by a graphics processor. Drawing into volatile object 901 may be performed by generating drawing commands by a client application to the graphics processor. Data for volatile object 901, e.g., a first surface, is referenced or used for a period of time from T4 to T5, as an input to draw into volatile object 902, e.g., a second surface. For example, a content of a first surface may be referenced to do some depositing operation to draw into a second surface. In other words, the first surface may be used to draw into the second surface.

Figure 10:
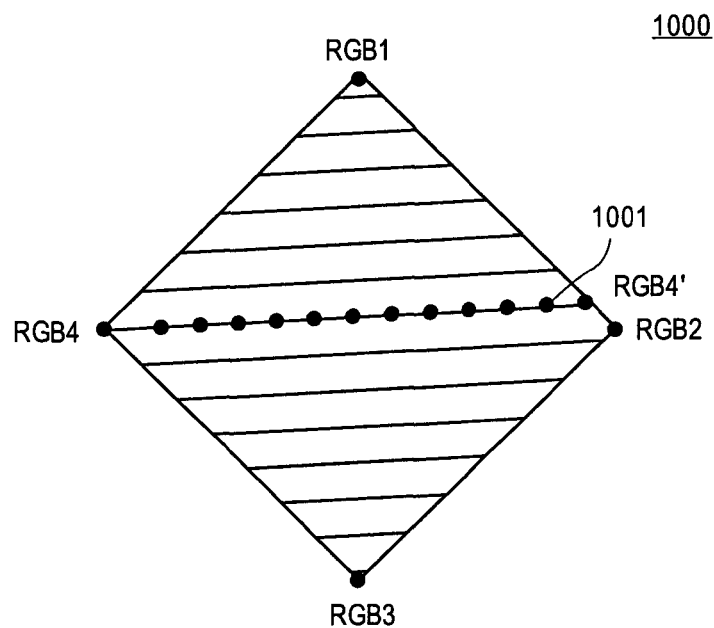
FIG. 10 illustrates drawing into a surface object according to one embodiment of the invention.

After referencing or using data for volatile object 901 to draw into volatile object 902, the volatile object 901 is discarded to make a room for other data. That means, data for volatile object 901 is retained for a period of time, e.g., until the space in a video memory is needed for other data. Periods of time when data for volatile graphics objects are needed in the video memory are balanced to effectively manage a physical space in a video memory. As shown in FIG. 9, data for volatile object 901 is retained from time T1 when drawing into volatile object 901 started, to time T5 when referencing or using of volatile object 901 is completed. In one embodiment, drawing into a surface object means determining RGB values for pixels in a polygon 1000, as shown in FIG. 10. RGB values for pixels RGB1, RGB2, RGB3, and RGB4 may set various shadings of pixels in the polygon shown in FIG. 10.

Figure 11:
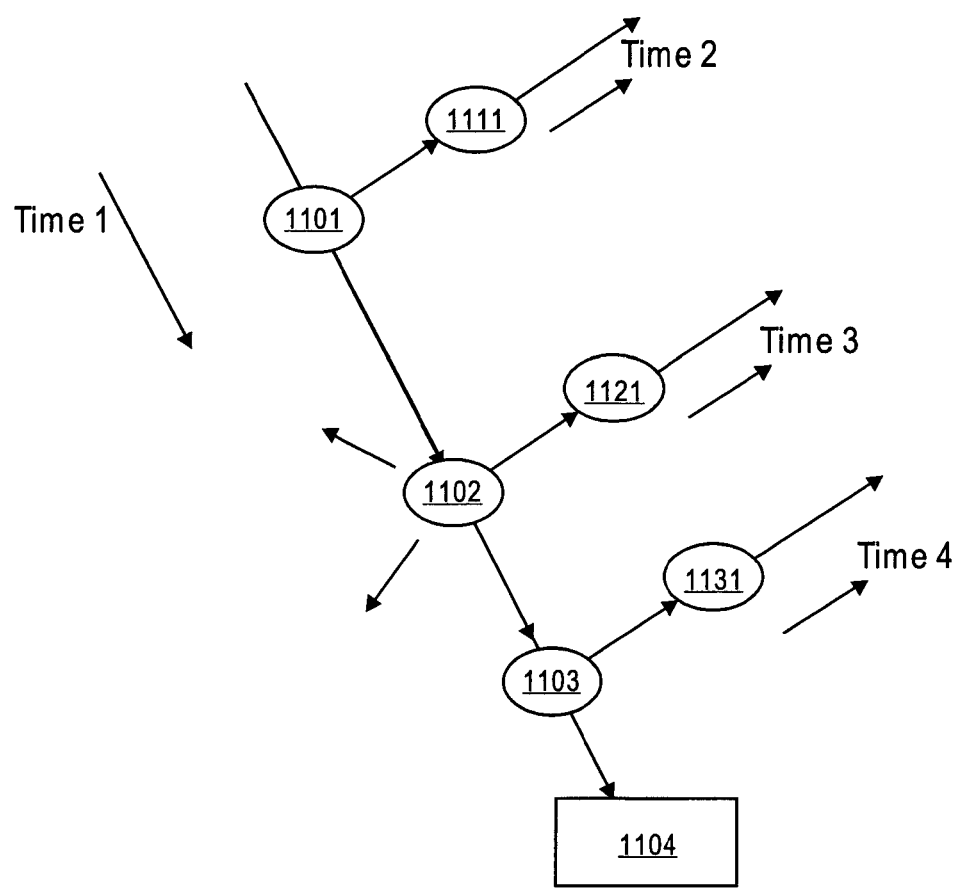
FIG. 11 illustrates referencing or using a volatile object as an input to draw into another graphics object according to another embodiment of the invention.

FIG. 11 is a schematic of a rendering tree that illustrates referencing or using a volatile object as an input to draw another graphics object according to another embodiment of the invention. For example, graphics object 1102 uses graphics object 1101 as an input to create graphics object 1102. As shown in FIG. 11, rendering tree 1100 has nodes representing volatile graphics objects 1101, 1102, 1103, 1111, 1121, and 1131, and branches representing processing timelines Time1-Time4. In one embodiment, volatile graphics objects are surfaces. As shown in FIG. 11, each volatile graphics object is referenced or used as an input to draw into a next volatile graphics object along a respective timeline. For example, volatile graphics object 1103 is discarded after being referenced or used as the input for creating graphics object 1104 without being paged from the video memory, e.g., VRAM. As a result, graphics object 1104 is generated using inputs from each the volatile graphics objects 1101, 1102, and 1103 along timeline Time 1. Each timeline represents a graphics computing process, which uses data from a prior process to generate further graphics data.

Data, or content for a next volatile graphic object is generated based on an input from a preceding volatile graphics object. Therefore each of the volatile graphics objects shown in FIG. 11 may be discarded after being referenced or used, to free a space in a video memory, such that paging the volatile graphics object out and into a video memory is avoided. Periods of time when data for a volatile graphics object is needed in the video memory are being balanced to switch from timeline T1 to timelines Time 2, Time 3, or Time 4 and effectively manage a physical space in the video memory. Instead of actually paging graphics objects into and out of a video memory, e.g., VRAM, switching between drawing regions in the video memory is performed that may tremendously increase the performance of the graphics system, because transferring of data across a rather slow bus from a video memory to a system memory is avoided. Additionally, switching between drawing regions in the video memory without paging data out of and into the video memory saves a space in the system memory, because the copy of the graphics object is not being retained in the system memory.

In another embodiment, a graphics object is marked as volatile after being referenced or used as an input to generate another graphics object. Then the graphics object marked as volatile may be discarded to free a space in a video memory without being paged out and into the video memory.

Figure 15:
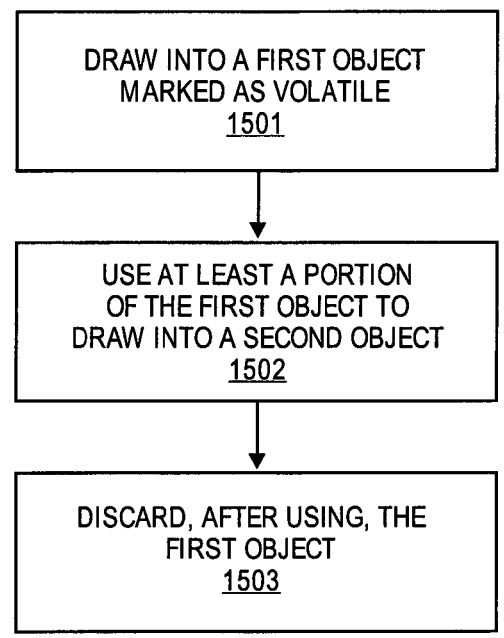
FIG. 15 is a flowchart of a method of referencing or using volatile graphics objects in a video memory according to one embodiment of the invention.

FIG. 15 is a flowchart 1500 a method of referencing or using volatile graphics objects in a video memory according to one embodiment of the invention. The method begins with operation 1501 of drawing by a graphics processor into a first object created in a video memory, e.g., VRAM, and marked as volatile. The method continues with operation 1502 of referencing or using at least a portion of the first object as an input to draw into a second object. Next, the method continues with operation 1503 of discarding, after referencing or using, the first object to make room for other data in the video memory without have to page out data for the first object from the video memory. In one embodiment, the first object is a first surface and a content attached to the first surface is marked as volatile. The content attached to the first surface is referenced or used to draw into a second graphics object. After being referenced or used, the content attached to the first surface and marked as volatile is discarded. In one embodiment, the method is performed by a graphics subsystem described above with respect to FIGS. 2A and 2B. In one embodiment, the video memory, wherein volatile graphics objects are stored, is virtualized as described above with respect to FIGS. 2-4.

Figure 16:
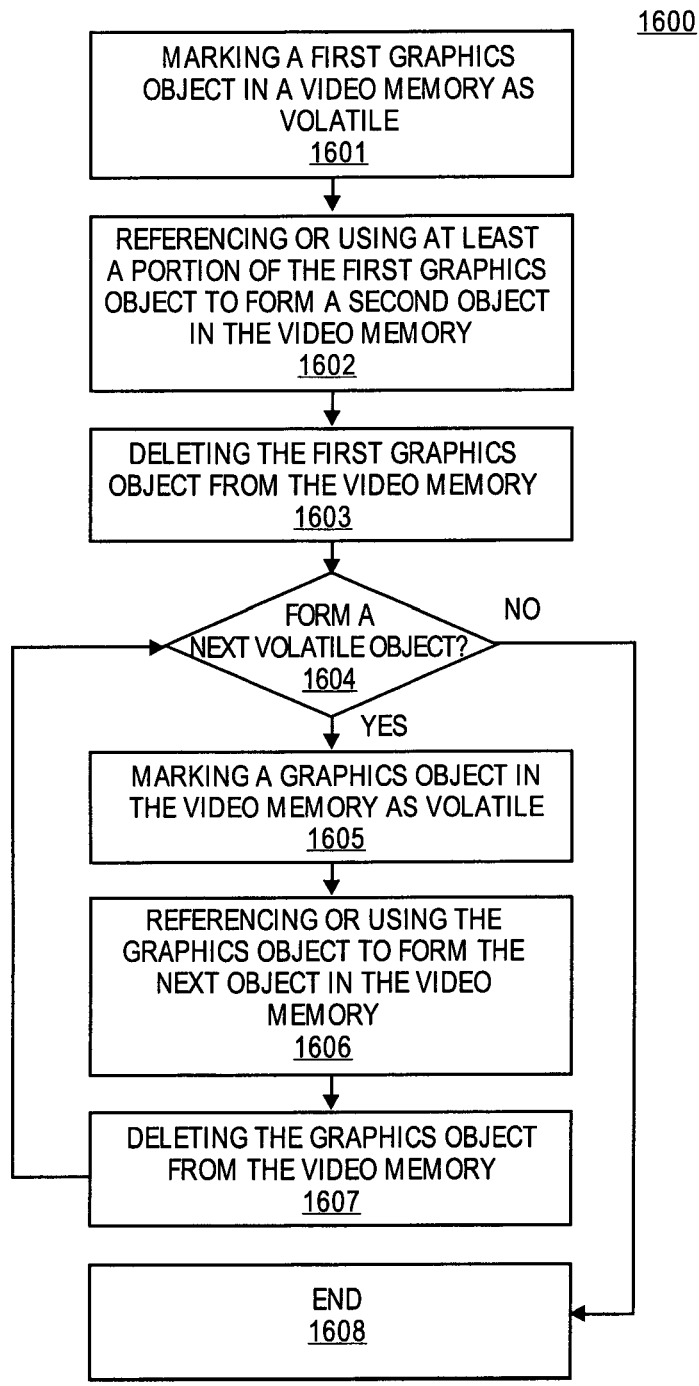
FIG. 16 is a flowchart of a method of referencing or using volatile graphics objects in a video memory according to another embodiment of the invention.

FIG. 16 is a flowchart 1600 of a method of referencing or using volatile graphics objects in a video memory according to another embodiment of the invention. The method begins with operation 1601 of marking a first graphics object in a video memory as volatile. Marking the first graphics object as volatile is described above with respect to FIGS. 5 and 12. The method continues with operation 1602 of referencing or using at least a portion of the first graphics object to form a second graphics object in the video memory, e.g., VRAM. The first graphics object is deleted, after being referenced or used, without paging out data for the first graphics object from the video memory, in operation 1603. Next, the determination is made in operation 1604 whether next volatile graphics object needs to be formed in the video memory. If next volatile object needs to be formed, the method continues with operation 1605 of marking the graphics object as volatile. Further, the volatile graphics object is referenced or used in operation 1606 to form next graphics object in video memory. Next, the volatile graphics object is deleted in operation 1607, after being referenced or used, to make room for other data in the video memory without being paged out from the video memory. Operations 1604 to 1607 are continuously repeated until volatile objects are not needed. If the volatile object does not need to be formed the method ends with operation 1608. It is noted that, in at least certain embodiments, the marking of data as being volatile occurs as the data is being stored in the video memory, rather than after it is stored.

Figure 17:
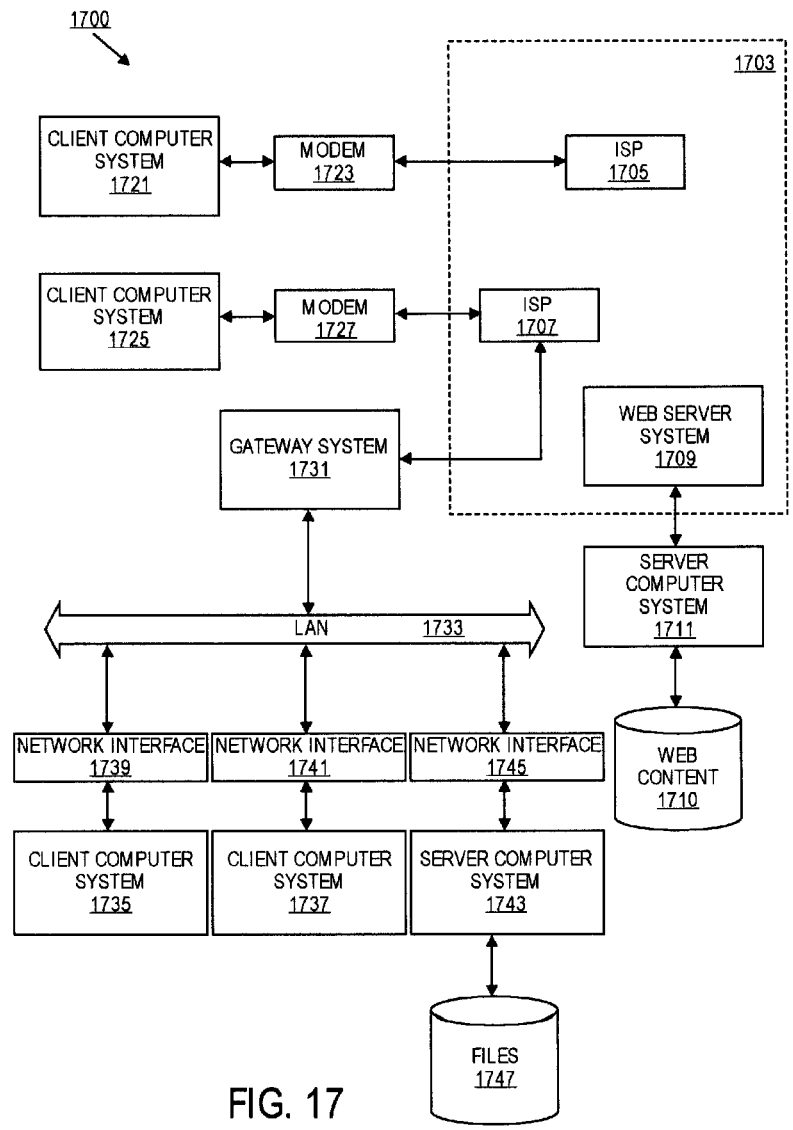
FIG. 17 illustrates an exemplary embodiment of a computer network to manage volatile objects in a video memory.

FIG. 17 illustrates an exemplary embodiment of a system 1700, which may be a computer network, to manage volatile objects in a video memory as described above with respect to FIGS. 2-16. As shown in FIG. 17, client computer systems 1721, 1725, 1735, and 1737 are coupled together through a network 1703, e.g., the Internet, using Internet service providers ("ISP") 1705 and 1707 as known to one of ordinary skill in the computer art. Volatile graphics objects may be created and managed in a video memory without being paged out and into a system memory as described with respect to FIGS. 2-16, in any of the client computer systems 1721, 1725, 1735, and 1737, server computer systems 1743, 1709, and 1711, or a combination thereof.

As shown in FIG. 17, Web server system 1709 may be a server computer system known to one of ordinary skill in the computer art. Web server 1709 may be coupled through server computer system 1711 to web content 1710, e.g., a media database. Client computer systems 1721 and 1725 are connected to the Internet 1703 through modem interfaces 1723 and 1727, and client computer systems 1735, 1737, and server computer system 1743 are connected to the Internet 1703 through network interfaces 1739, 1741, 1745, e.g., Ethernet, local area network ("LAN") bus 1733, and gateway system 1731. Client computer systems may be a personal computer system, a network computer, a Web TV system, or other computer system. Gateway system 1731 may provide firewall and other Internet related services for the local area network and may be a server computer system known to one of ordinary skill in the computer art. Server computer system 1743 may directly provide files 1747 and other services to client computer systems 1735 and 1737 through LAN bus 1733 as known to one of ordinary skill in the computer art.

Figure 18:
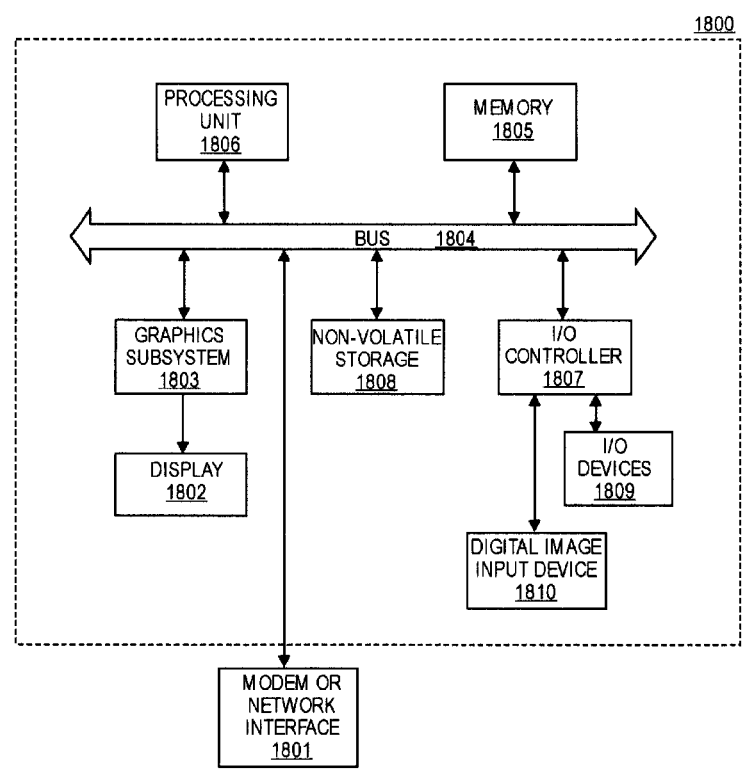
FIG. 18 illustrates another exemplary embodiment of a computer system to manage volatile objects in a video memory.

FIG. 18 illustrates another exemplary embodiment of a computer system 1800 to manage volatile objects in a video memory as described above with respect to FIGS. 2-16. Computer system 1800 may be used as a client computer system, a server computer system, or as a web server system, or may perform many of the functions of an Internet service provider. Volatile graphics objects may be created and managed in a video memory of a graphics subsystem 1803 without being paged out and into a system memory 1805 as described above with respect to FIGS. 2-16.

The computer system 1800 may interface to external systems through a modem or network interface 1801, e.g., an analog modem, ISDN modem, cable modem, token ring interface, or satellite transmission interface. As shown in FIG. 18, the computer system 1800 includes a processing unit 1806, which may be a conventional microprocessor e.g., an Intel Pentium microprocessor or Motorola Power PC microprocessor, which are known to one of ordinary skill in the computer art. System memory 1805 is coupled to processing unit 1806 by a system bus 1804. System memory 1805 may be DRAM, RAM, static RAM ("SRAM"), or any combination thereof. Bus 1804 couples processing unit 1806 to system memory 1805, to non-volatile storage 1808, to graphics subsystem 1803 as described above with respect to FIGS. 2-16, and to the input/output ("I/O") controller 1807. Graphics subsystem 1803 controls a display device 1802, for example, a cathode ray tube (CRT) or liquid crystal display, which may be part of graphics subsystem 1803. The I/O devices 1809 may include a keyboard, disk drives, printers, a scanner, a mouse, and the like as known to one of ordinary skill in the computer art. A digital image input device 1810 may be a digital camera, which is coupled to I/O controller 1807. The non-volatile storage 1808 may be a magnetic hard disk, an optical disk, or another form of storage for large amounts of data. Some of this data is often written, by a direct memory access process, into system memory 1805 during execution of software in the computer system 1800.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, the method comprising:
    allocating a space in a video memory for a first graphics object, wherein the video memory is virtualized by a virtual memory system that is configured to page data out of and into the video memory;
    storing the first graphics object in the allocated space;
    receiving a command to store a second graphics object in the virtual memory;
    searching for space in the video memory storing a graphics object associated with a volatile state indicator;
    determining from the search that the space in the video memory allocated to the first graphics object stores a graphics object associated with the volatile state indicator; and
    storing, in response to the determination, the second graphics object in at least a portion of the allocated space, wherein at least a portion of the first graphics object that was previously stored in the allocated space is discarded without being paged out due to the first graphics object having the volatile state indicator.

2. The method of claim 1, wherein the second graphics object is stored in the portion of the space previously allocated to the first graphics object in response to determining the video memory has an insufficient amount of free space for the second graphics object.

3. The method of claim 1, further comprising:
    using at least a portion of the first graphics object to form a third graphics object; and
    setting the first graphics object into a volatile state in response to the use of the portion of the first graphics object.

4. The method of claim 1, further comprising:
    managing allocation of the video memory through a virtualization map, the virtualization map indicating which graphics objects stored in the video memory are volatile and which graphics objects stored in the video memory are non-volatile.

5. The method of claim 1, wherein the volatile state indicator is an absence of an indicator representing a non-volatile state.

6. A non-transitory computer-readable medium storing instructions, which when executed by a processing device, cause the processing device to perform method comprising:
    allocating a space in a video memory for a first graphics object, wherein the video memory is virtualized by a virtual memory system that is configured to page data out of and into the video memory;
    storing the first graphics object in the allocated space;
    receiving a command to store a second graphics object in the virtual memory;
    searching for space in the video memory storing a graphics object associated with a volatile state indicator;
    determining from the search that the space in the video memory allocated to the first graphics object stores a graphics object associated with the volatile state indicator; and
    storing, in response to the determination, the second graphics object in at least a portion of the allocated space, wherein at least a portion of the first graphics object that was previously stored in the allocated space is discarded without being paged out due to the first graphics object having the volatile state indicator.

7. The non-transitory computer-readable medium of claim 6, wherein the second graphics object is stored in the portion of the space previously allocated to the first graphics object in response to determining the video memory has an insufficient amount of free space for the second graphics object.

8. The non-transitory computer-readable medium of claim 6, the method further comprising:
    using at least a portion of the first graphics object to form a third graphics object; and
    setting the first graphics object into a volatile state in response to the use of the portion of the first graphics object.

9. The non-transitory computer-readable medium of claim 6, the method further comprising:
    managing allocation of the video memory through a virtualization map, the virtualization map indicating which graphics objects stored in the video memory are volatile and which graphics objects stored in the video memory are non-volatile.

10. The non-transitory computer-readable medium of claim 6, wherein the volatile state indicator is an absence of an indicator representing a non-volatile state.

11. An apparatus, comprising:
    a processing device, wherein the processing device executes instructions that cause the apparatus to:
        allocate a space in a video memory for a first graphics object, wherein the video memory is virtualized by a virtual memory system that is configured to page data out of and into the video memory;
        store the first graphics object in the allocated space;
        receive a command to store a second graphics object in the virtual memory;
        search for space in the video memory storing a graphics object associated with a volatile state indicator;

determine from the search that the space in the video memory allocated to the first graphics object stores a graphics object associated with the volatile state indicator; and store, in response to the determination, the second graphics object in at least a portion of the allocated space, wherein at least a portion of the first graphics object that was previously stored in the allocated space is discarded without being paged out due to the first graphics object having the volatile state indicator.

12. The apparatus of claim 11, wherein the second graphics object is stored in the portion of the space previously allocated to the first graphics object in response to determining the video memory has an insufficient amount of free space for the second graphics object.

13. The apparatus of claim 11, wherein the processing device further causes the apparatus to:

use at least a portion of the first graphics object to form a third graphics object; and set the first graphics object into a volatile state in response to the use of the portion of the first graphics object.

14. The apparatus of claim 11, wherein the processing device further causes the apparatus to:

manage allocation of the video memory through a virtualization map, the virtualization map indicating which graphics objects stored in the video memory are volatile and which graphics objects stored in the video memory are non-volatile.

15. The apparatus of claim 11, wherein the volatile state indicator is an absence of an indicator representing a non-volatile state.

* * * * *